A. I. APPLETON.
JUNCTION BOX.
APPLICATION FILED FEB. 15, 1912.

1,119,057. Patented Dec. 1, 1914.

Witnesses:-

Inventor:-
Albert I. Appleton
by Luther L. Miller
Atty.

UNITED STATES PATENT OFFICE.

ALBERT I. APPLETON, OF CHICAGO, ILLINOIS, ASSIGNOR TO APPLETON ELECTRIC COMPANY, OF CHICAGO, ILLINOIS, A CORPORATION OF ILLINOIS.

JUNCTION-BOX.

1,119,057.  Specification of Letters Patent.  Patented Dec. 1, 1914.

Application filed February 15, 1912. Serial No. 677,808.

*To all whom it may concern:*

Be it known that I, ALBERT I. APPLETON, a citizen of the United States, residing at Chicago, in the county of Cook and State of Illinois, have invented certain new and useful Improvements in Junction-Boxes, of which the following is a specification.

This invention relates to electric junction boxes used for distributing wires from the main lines to various apparatus throughout a building or a room, and, if desired, to other junction boxes.

It has for its object the production of boxes containing a suitable panel board for the purpose of connecting the individual wires to the main leads, and so constructed that the lead wires cannot be tapped without opening the box.

It has for a further object the provision of means for sealing the box in a closed condition when the distributing wires are in use, and also for sealing the opening through which the individual wires pass from the box when such wires are not in service. So that in neither case can the box be opened and the main leads tapped without the knowledge of the inspector.

Other objects will appear to those skilled in the art as the box is more fully described hereinafter.

Figure 1:
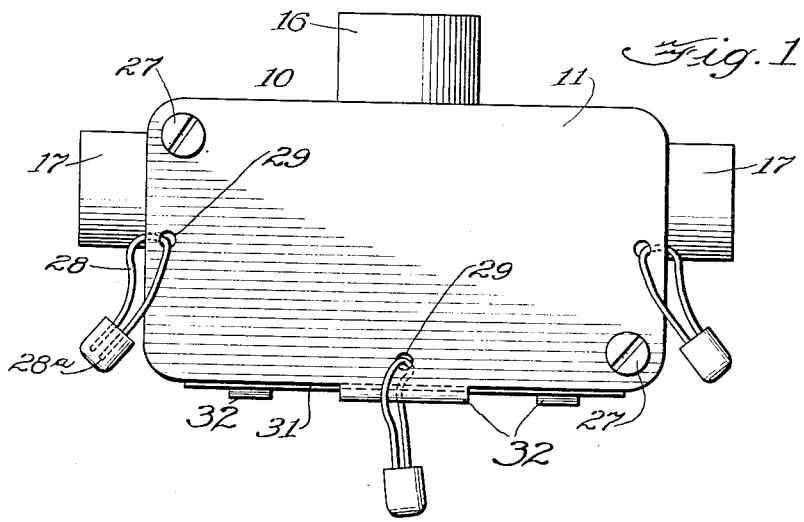
Figure 2:
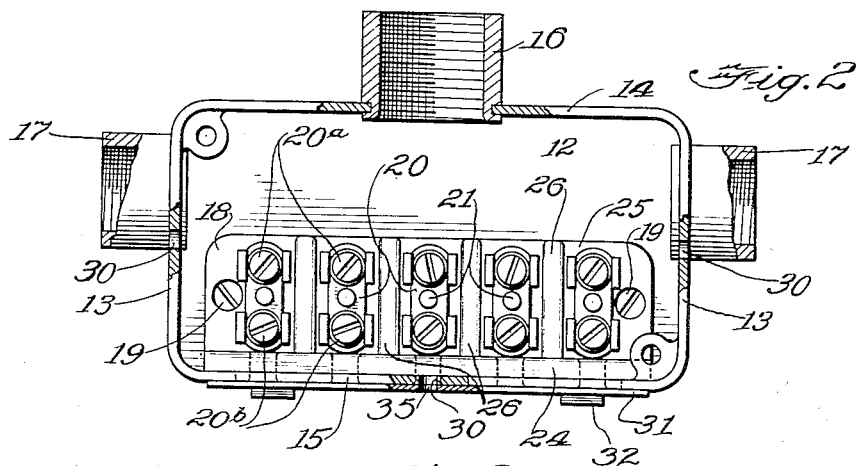
Figures 3, 4, 5:
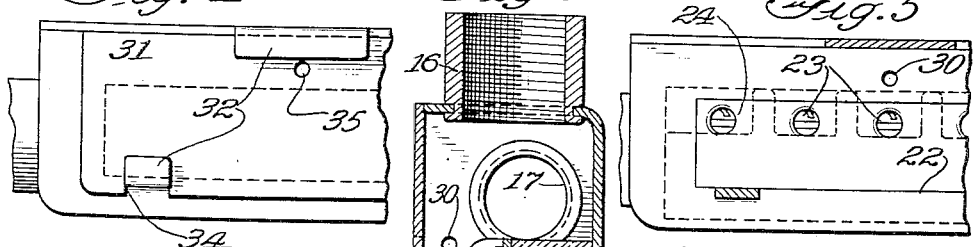

In the accompanying drawings, Figure 1 is a side view of a box illustrating an embodiment of my invention. Fig. 2 is a side view of the same with the lid or cover removed, with portions in section and other portions broken away. Fig. 3 is a central transverse section of the box. Fig. 4 is a fragmental side elevation with the sealing plate in position. Fig. 5 is a fragmental side elevation with the plate removed.

The junction box 10 comprises a lid or cover 11, a back side 12, ends 13, an upper side 14, and a lower side 15. The main leads enter the box through the conduit inlet 16 in the upper side of the box. And in each end may be an inlet 17 for connecting the box by means of wires and conduit with other similar boxes, or other devices. However, one or both of these end outlets may be omitted if desired. Within the box is located an insulating block or panel board 18 secured to the bottom of the box by means of screws 19. Upon this panel board are mounted a plurality of metallic strips or terminal connectors 20 by means of screws 21. Each of these connectors has two binding posts $20^a$ and $20^b$. The entering leads are connected with the posts $20^a$ and the distributing wires are connected with the posts $20^b$.

In the lower side of the box is an elongated opening 22 through which the distributing wires enter the box. The wires then pass through individual openings 23 in an insulation strip or flange 24 projecting outwardly from the lower edge of the body portion or base 25 of the panel board. The openings 23 are of such diameter as to be filled by the insulated distributing wires so that other wires cannot be inserted and the main leads tapped when the distributing wires are in place. Between the connectors 20 the panel board is provided with outwardly projecting insulating ribs 26, which prevent accidental short-circuiting of the connectors or the terminals, and allow a more compact arrangement of the connectors.

The cover 11 may be attached to the box temporarily by means of the screws 27, but when the leads have been entered and attached to the terminals of the panel board, the cover may be sealed in place by means of ordinary wire and malleable metal seals 28 and $28^a$, the wires passing through openings 29 in the cover and 30 in the ends and lower side of the box. The portion $28^a$ of the seals may have suitable identifying marks thereon so that any tampering with the seal will be indicated. Evidently when the box is so sealed, and with the insulated distributing wires filling the openings 23, a meter in any of the distributing circuits cannot be short-circuited, or the box cannot otherwise be interfered with without the knowledge of the inspector.

If, for any reason, the distributing lines are not to be in service for any material length of time, they may be disconnected from the terminals $20^b$, and the opening 22 in the lower side of the box may be closed by means of a plate 31. Lugs 32 projecting from the lower side of the box hold said plate from outward movement, and notches 34 in one edge of said plate hold it from longitudinal movement. This plate may then be sealed in position by means of the wire 28 passing through the opening 35 in the plate, the opening 30 in the lower side of the box which registers with the opening 35, and the adjacent opening 29 in the cover of the box. It will thus be seen that the interior of the box may be effectively sealed from any disturbance whether or not the distributing wires are in the service. Evidently the number of connectors on the panel board may be increased or decreased, as desired, by correspondingly increasing or decreasing the length of the board and the box. In this instance I have used five connectors which allows, with a three wire system, the use of four distributing circuits, the fifth connector receiving the neutral wire. If it is desired to introduce a greater number of operating circuits than is provided for by a single box, other similar boxes may be placed adjacent the main lead box, or so far therefrom as may be desired; said boxes may omit or not, as desired, the main lead inlet 16 and one of the distributing outlets 17. Evidently the position of said sealed openings in the box, and other details of the structure herein set forth may be varied by those skilled in the art without departing from the scope of the claims.

I claim as my invention:

1. A junction box having a wire inlet in one side thereof, a panel board is said box, said board having wire connectors mounted thereon, one side of said box having an elongated opening therethrough adjacent said panel board, an insulating strip on said board closing said opening, said strip having openings therethrough for admitting wires adjacent said connectors, a removable cover for said box, a plate adapted to close said elongated opening, and means for sealing said cover and said plate in their closed positions.

2. A junction box having a wire inlet therein and having a relatively large opening in one of its walls, a strip of insulating material closing said opening, a plurality of wire connectors in the box, said strip having a plurality of holes therein for said wire connectors, a plate for closing said relatively large opening, a cover for the box, and means for sealing said plate and said cover in their closed position.

3. A junction box having an inlet in one wall, and a relatively large opening in another wall, a plurality of wire connectors in the box, a strip of insulating material lying along the inner side of the box wall and closing said opening, said strip having a plurality of holes therethrough registering with said opening and adapted to receive wires leading to said wire connectors, a plate adapted to lie at the outer side of the box and close said opening and said holes, and means for sealing said plate in such closing position.

4. A junction box having an inlet in one wall and a relatively large opening in another wall, a block of insulating material mounted in the box and having a flange closing said opening, a series of wire connectors mounted on said block, said flange having a series of openings to receive individual wires running to said connectors, a plate adapted to lie at the outer side of the box and closing said opening and said holes, a cover for the box, and means for sealing said plate and said cover in their closed position.

In testimony whereof I affix my signature in the presence of two witnesses.

ALBERT I. APPLETON.

Witnesses:
 EARL C. CARLSON,
 GEORGE L. CHINDAHL.